United States Patent
Inoue et al.

(10) Patent No.: US 7,580,245 B2
(45) Date of Patent: Aug. 25, 2009

(54) CAPACITOR DEVICE

(75) Inventors: Tatehiko Inoue, Osaka (JP); Shusaku Kawasaki, Osaka (JP); Kimiyasu Kakiuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 374 days.

(21) Appl. No.: 11/631,884

(22) PCT Filed: Jun. 12, 2006

(86) PCT No.: PCT/JP2006/011729

§ 371 (c)(1),
(2), (4) Date: Jan. 8, 2007

(87) PCT Pub. No.: WO2006/134859

PCT Pub. Date: Dec. 21, 2006

(65) Prior Publication Data

US 2007/0253146 A1 Nov. 1, 2007

(30) Foreign Application Priority Data

Jun. 17, 2005 (JP) .............................. 2005-177241

(51) Int. Cl.
H01G 5/38 (2006.01)
(52) U.S. Cl. ...................................... 361/522; 361/541
(58) Field of Classification Search ................. 361/522, 361/541
See application file for complete search history.

(56) References Cited

U.S. PATENT DOCUMENTS

2006/0146480 A1* 7/2006 Thrap .......................... 361/522

FOREIGN PATENT DOCUMENTS

| JP | 58-95629 | 6/1983 |
|----|----------|--------|
| JP | 03-25223 | 3/1991 |
| JP | 09-148183 | 6/1997 |
| JP | 10-106902 | 4/1998 |
| JP | 2000-315632 | 11/2000 |
| JP | 2002-151717 | 5/2002 |
| JP | 2002-353078 | 12/2002 |
| JP | 2004-247320 | 9/2004 |

* cited by examiner

*Primary Examiner*—Eric Thomas
(74) *Attorney, Agent, or Firm*—Wenderoth, Lind & Ponack, LLP.

(57) ABSTRACT

A capacitor device has a plurality of capacitors, each including a capacitor element having a positive electrode and a negative electrode in a confronting arrangement through a separator, and a metal case encasing the capacitor element and an electrolyte. The plurality of capacitors include a plurality of first capacitors, each using the metal case as a negative electrode, and a plurality of second capacitors, each using the metal case as a positive electrode. The capacitor device is characterized by a structure that a pair of the first capacitor and the second capacitor form a capacitor unit by having their metal cases coupled with a metal plate, a plurality of capacitor units form a subunit by being connected in series or parallel, and a plurality of subunits form a main unit by being connected in series or parallel. The invention helps facilitate connections when coupling the plurality of capacitor units, and substantially reduces a space required for the connections. The invention also decreases an undesirable resistance associated with the connections.

11 Claims, 9 Drawing Sheets

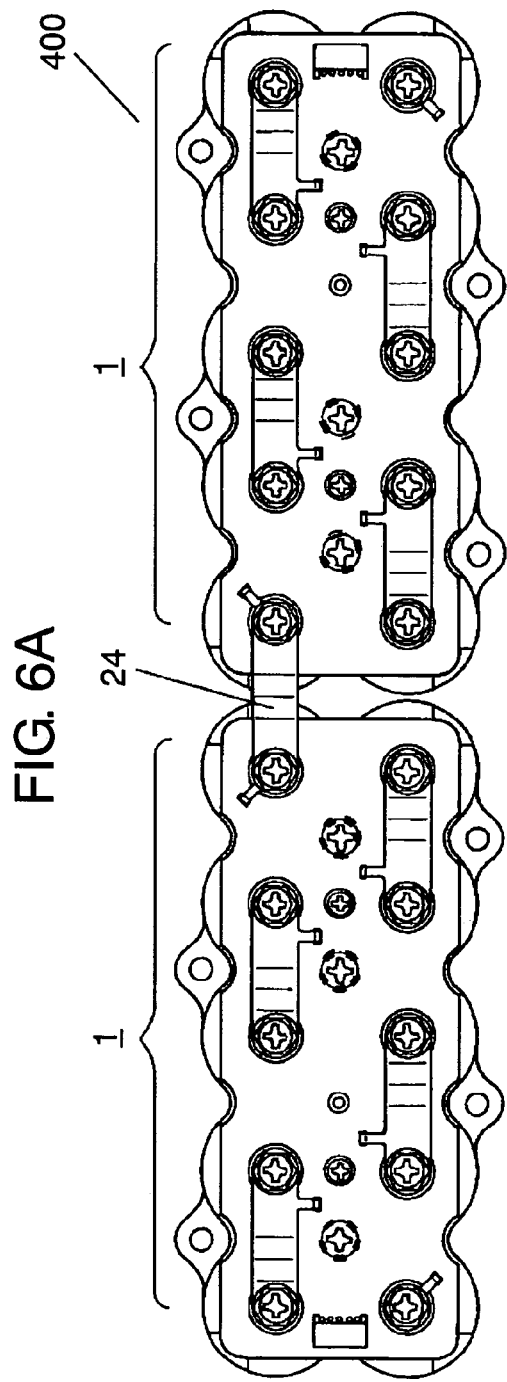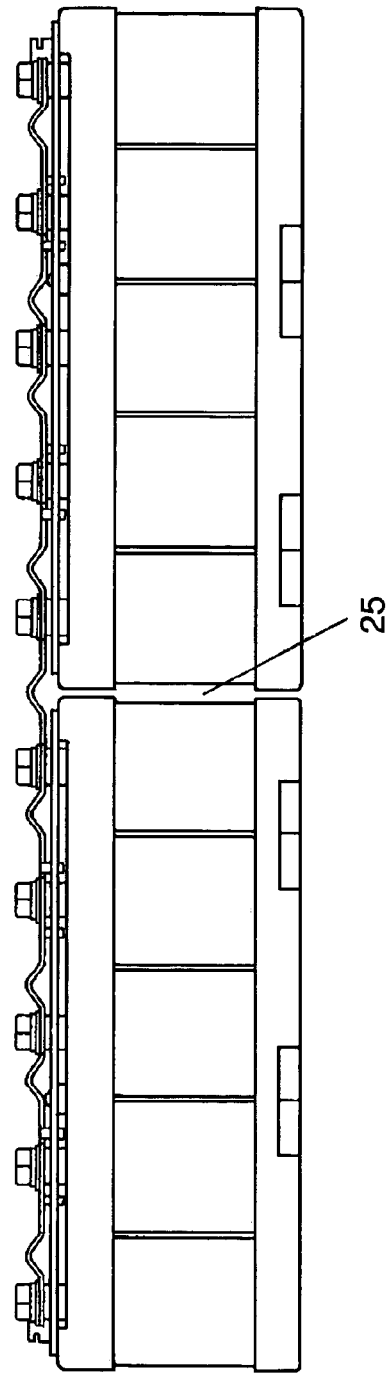

CAPACITOR DEVICE

TECHNICAL FIELD

The present invention relates to a capacitor device used for the purpose of regeneration or storage of power in a hybrid car, fuel cell vehicle, and the like.

BACKGROUND ART

FIG. 9 is a sectional view depicting a structure of capacitor 90 used for a capacitor device of the prior art. Capacitor element 30 includes aluminum foils, each having a polarizable electrode layer formed thereon, which serve as electrodes (i.e., collectors). A pair of the electrodes are arranged in positions shifted with respect to each other, with a separator placed between them, and this pair of the electrodes and the separator are wound together. Capacitor element 30 made in this manner is provided with a positive electrode and a negative electrode tapped individually from both end surfaces (i.e., the top and the bottom sides in the drawing of FIG. 9).

Capacitor 90 comprises metal case 31 made of aluminum encasing capacitor element 30 together with an activating electrolyte, although not show in the figure, and negative electrode terminal 31a formed integrally on the bottom of metal case 31 for external connection. The end surface at the negative electrode side of capacitor element 30 is connected both mechanically and electrically to the inner base of metal case 31 by such means as laser welding.

Capacitor 90 further comprises cover 32 made of aluminum, and positive electrode terminal 32a formed integrally with cover 32 for external connection. The end surface at the positive electrode side of capacitor element 30 is connected to cover 32 by such means as the laser welding. This also ensures the mechanical and electrical connection. At the same time, a circumferential fringe of cover 32 and an opening edge of metal case 31 are crimped together with an interlayer of an insulating material placed between them, though not shown in the figure, to form crimped portion 33. The capacitor is sealed in this manner by the process of crimping.

A capacitor device of the prior art contains a plurality of capacitors, each having positive electrode terminal 32a and negative electrode terminal 31a for external connections along a longitudinal axis in the center of metal case 31 (i.e., a vertical orientation in FIG. 9), which are coupled by using a connecting member called a bus bar although not shown in FIG. 9. The capacitor device containing the plurality of coupled capacitors 90 is used as a backup power supply or the like of a vehicle.

One example of the above prior art is disclosed in Japanese Patent Unexamined Publication, No. 2000-315632.

In the capacitor device of the prior art, however, it has not been so easy to make connections of positive electrode terminals 32a and negative electrode terminals 31a in the process of coupling the plurality of capacitors 90 since these terminals are extended out to the opposite sides with respect to each other. This device has also had a problem that it cannot be reduced in size because it requires connecting spaces at both sides, which inevitably results in an overall large mounting space.

Moreover, when the above conventional capacitor device having a plurality of coupled capacitors 90 is used as an auxiliary power supply for a motor of a fuel cell vehicle, it necessitates lengthy routing of connecting lines for the reason that the terminals are located at both ends opposite to each other. Consequently, there has been a problem that a large loss occurs due to an undesirable increase in resistance.

Description is now provided about this undesirable increase in resistance by using an example of a fuel-cell stack for a fuel cell vehicle, with reference to FIGS. 10A and 10B.

Fuel-cell stack 51 of the fuel cell vehicle supplies a voltage of 400V, as shown in FIG. 10A. On the other hand, capacitors 60 of capacitance "Ci" have a rated voltage of approx. 2.0V. It is therefore necessary to provide 200 units of capacitors (i.e., 400V/2V=200) connected in series. A load current of approx. 200 A flows at the maximum. Here, load "LO" includes a motor load and a motor controller load.

Each of the capacitors has an internal resistance "R1" of $0.002\Omega$, as shown in FIG. 10B. Assuming that there is connection resistance "R2" of $0.0001\Omega$ at terminals of the individual capacitors, it adds up to $0.0021\Omega$ (i.e., $0.002+0.0001=0.0021$) when connected in series. A total resistance thus becomes $0.002\Omega \times 200 = 0.42\Omega$ in the case of the 200 units of serially connected capacitors.

When the current of 200 A flows through the combined resistance of $0.42\Omega$, it generates 16.8 kW of heat (i.e., $0.42\Omega \times 200 \text{ A} \times 200 \text{ A} = 16.8 \text{ kW}$) as a loss of the capacitors, which is dissipated outside.

In the case of the conventional capacitor device, there has been the problem as described above, that a substantial amount of heat is dissipated due to the large loss generated by the resistance attributed to the connections.

SUMMARY OF THE INVENTION

A capacitor device of the present invention is provided with a plurality of capacitors, wherein each of the capacitors comprises a capacitor element having a positive electrode and a negative electrode in a confronting arrangement through a separator, and a metal case containing the capacitor element and an electrolyte. The plurality of capacitors comprises a plurality of first capacitors having metal cases serving as their positive electrodes, and a plurality of second capacitors having metal cases serving as their negative electrodes. The capacitor device is characterized by a structure that a pair of the first capacitor and the second capacitor form a capacitor unit by having their metal cases coupled with a metal plate, a plurality of capacitor units form a subunit by being connected in series or parallel, and a plurality of subunits form a main unit by being connected in series or parallel.

The capacitor device of this invention helps ease connections necessary when coupling the plurality of capacitor units, and it also reduces a space required for the connections. In addition, it can reduce an undesirable resistance associated with the connections.

BRIEF DESCRIPTION OF DRAWINGS

FIG. 6A is a plan view depicting a main part of a structure of a main unit of a capacitor device according to a fourth exemplary embodiment of the present invention;

FIG. 6B is a front view depicting the main part of the structure of the main unit of the capacitor device according to the fourth exemplary embodiment of the present invention;

DETAILED DESCRIPTION OF PREFERRED EMBODIMENTS

First Exemplary Embodiment

Description is provided concretely of one mode of the present invention by describing a the first exemplary embodiment below.

Figure 1:
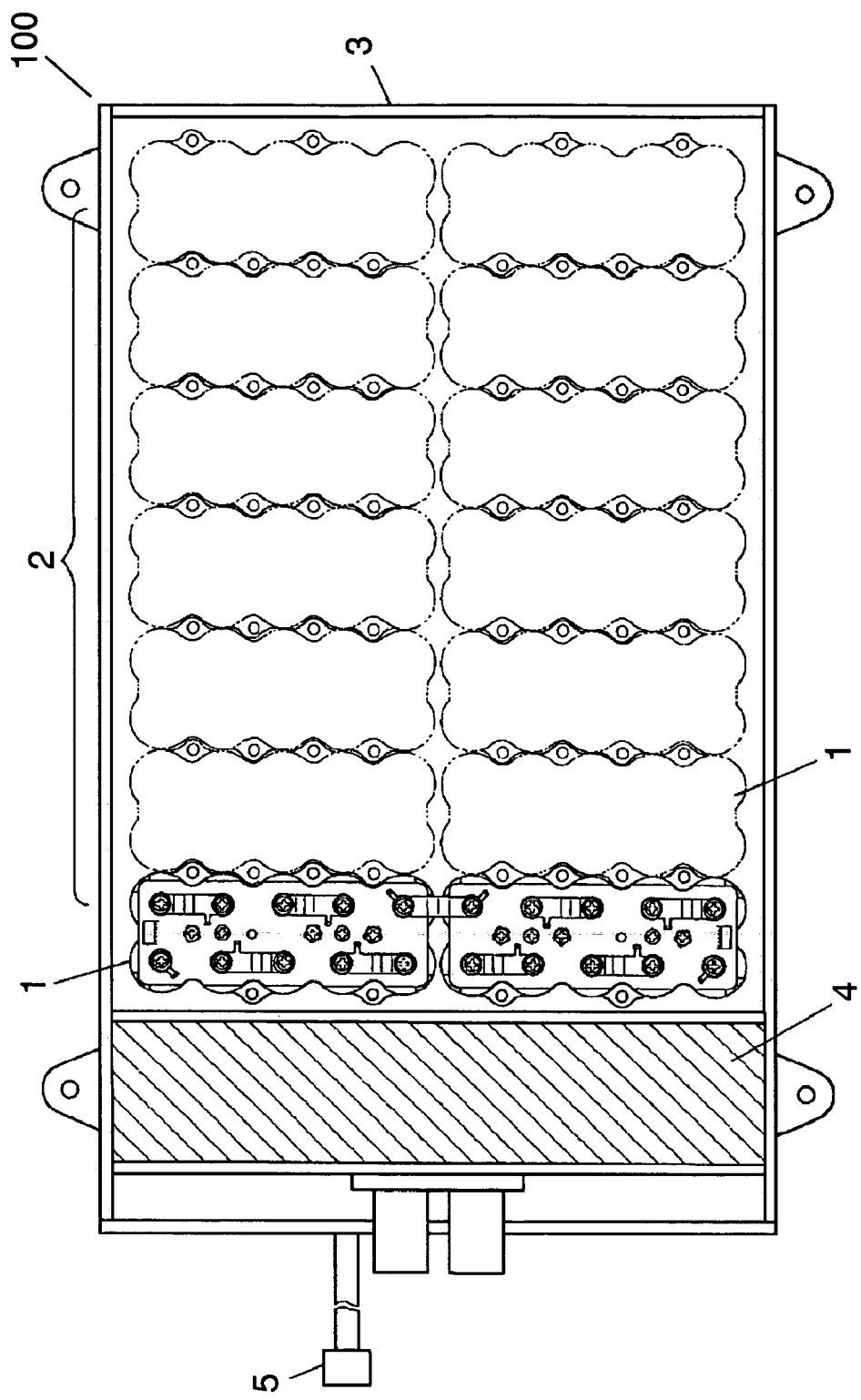
FIG. 1 is a plan view depicting a structure of a capacitor device according to a first exemplary embodiment of the present invention.
Figure 2:
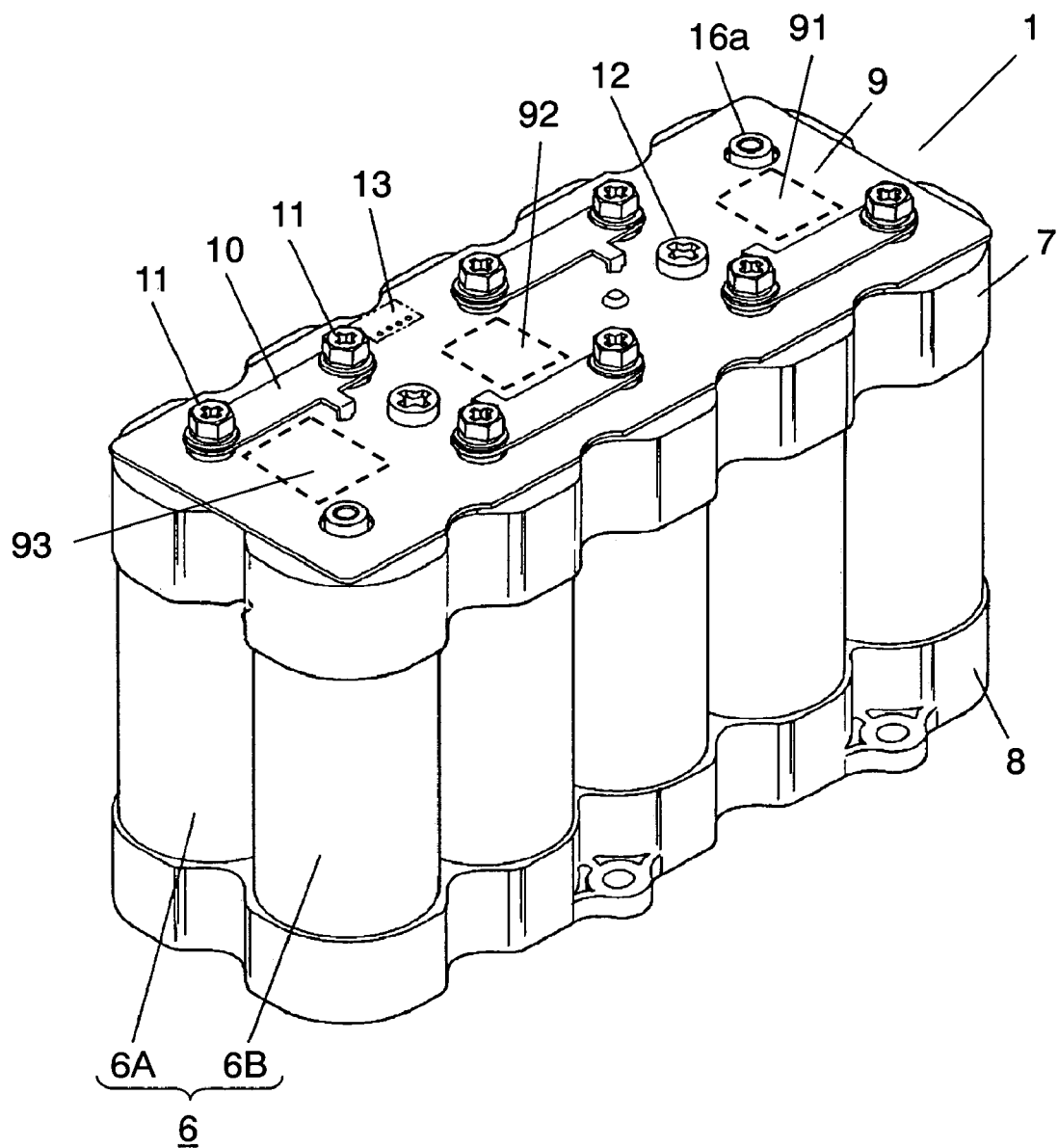
FIG. 2 is a perspective view depicting a structure of a subunit used in the capacitor device according to the first exemplary embodiment of the present invention.

FIG. 1 is a plan view depicting a structure of a capacitor device according to the first exemplary embodiment of the present invention, and FIG. 2 is a perspective view depicting a structure of subunit 1 used in the capacitor device.

As shown in FIG. 1 and FIG. 2, capacitor device 100 comprises subunit 1 having a mutually connected plurality of capacitor units 6, each of which comprises two pieces of serially connected and coupled capacitors having opposite polar orientations to each other (i.e., a first capacitor and a second capacitor). A plurality of subunits 1 are connected to compose main unit 2. Main unit 2 is then stored inside case 3. Case 3 contains controller 4 for controlling main unit 2, and input-output connector 5.

Subunit 1 has five sets of coupled capacitor units 6, as shown in FIG. 2. Each of capacitor units 6 comprises first capacitor 6A and second capacitor 6B, which are so constructed as to be opposite in their polar orientations with respect to each other. The two capacitors 6A and 6B are coupled so that they are connected in series. In this exemplary embodiment, description is provided of a model case, in which first capacitor 6A uses a metal case as a negative electrode, and second capacitor 6B uses a metal case as a positive electrode. However, the polarities of first capacitor 6A and second capacitor 6B may be reversed.

Subunit 1 is held in position between upper holder 7 and lower holder 8, both made of an insulation material, and circuit board 9 is disposed on top of upper holder 7. Terminals 16a of capacitor units 6 project from the surface of circuit board 9, and the projecting terminals 16a located next to each other are electrically connected through bus bars 10 and mechanically secured with screws 11.

There is also prop 12 made of an aluminum bar, which is provided between upper holder 7 and lower holder 8 in order to prevent a vertical force impressed on capacitor device 100 from acting directly on capacitor units 6.

Circuit board 9 is provided on its back surface with balancing charge circuit 91 for adjusting voltages being charged equally in the plurality of capacitors that constitute subunit 1, over-voltage detecting circuit 92 for detecting an over-voltage during a charging state, and thermometric circuit 93 for monitoring a temperature around the capacitors. Capacitor device 100 also comprises connector 13 for connecting the individual circuits to controller 4, which controls main unit 2. Shapes and locations of the individual circuits 91, 92 and 93, and connector 13 are illustrated here as a typical example.

Figure 3A:
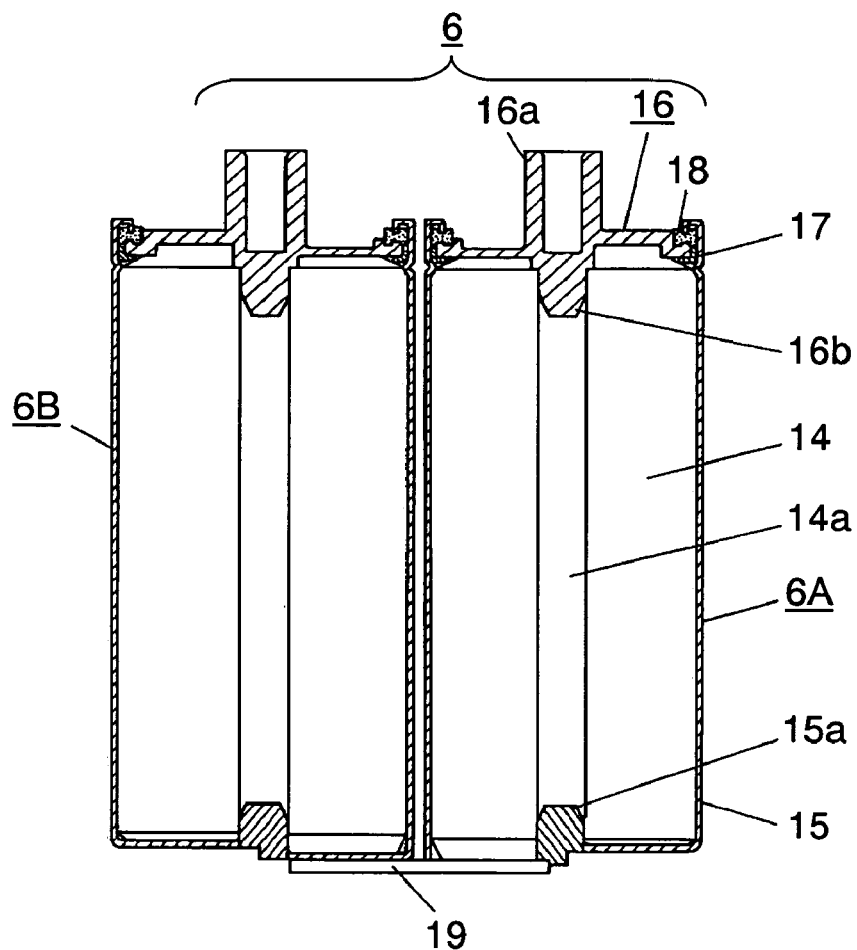
FIG. 3A is a sectional view depicting a structure of a capacitor unit used in the capacitor device according to the first exemplary embodiment of the present invention.
Figure 3B:
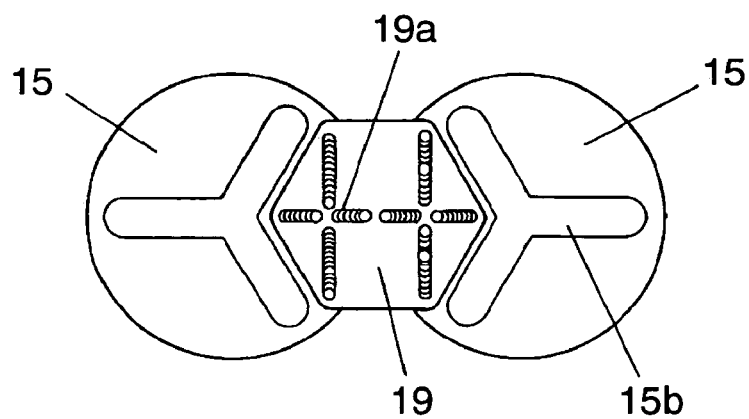
FIG. 3B is a bottom view depicting the structure of the capacitor unit used in the capacitor device according to the first exemplary embodiment of the present invention.

FIG. 3A and FIG. 3B are a sectional view and a bottom view depicting a structure of capacitor unit 6. Capacitor unit 6 has first capacitor 6A and second capacitor 6B, as shown in FIG. 3A and FIG. 3B. First capacitor 6A and second capacitor 6B are so constructed that their positive and negative polarities are arranged differently with respect to each other. Description is provided here of first capacitor 6A.

First capacitor 6A has capacitor element 14, which is provided with hollow space 14a formed therein.

Figure 8:
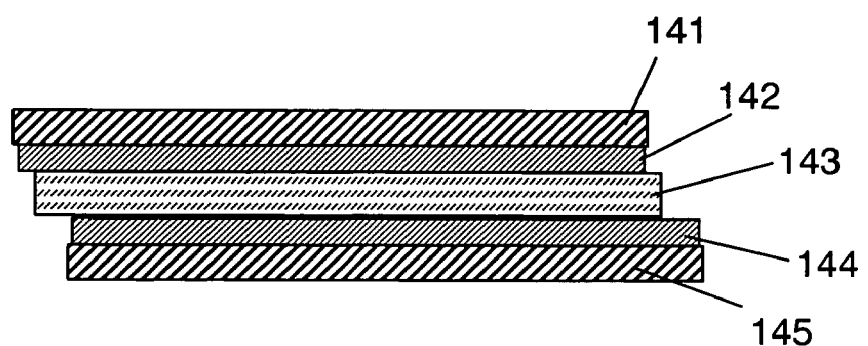
FIG. 8 is a sectional view depicting a partial structure of the capacitor element according to the present invention.
Figure 9:
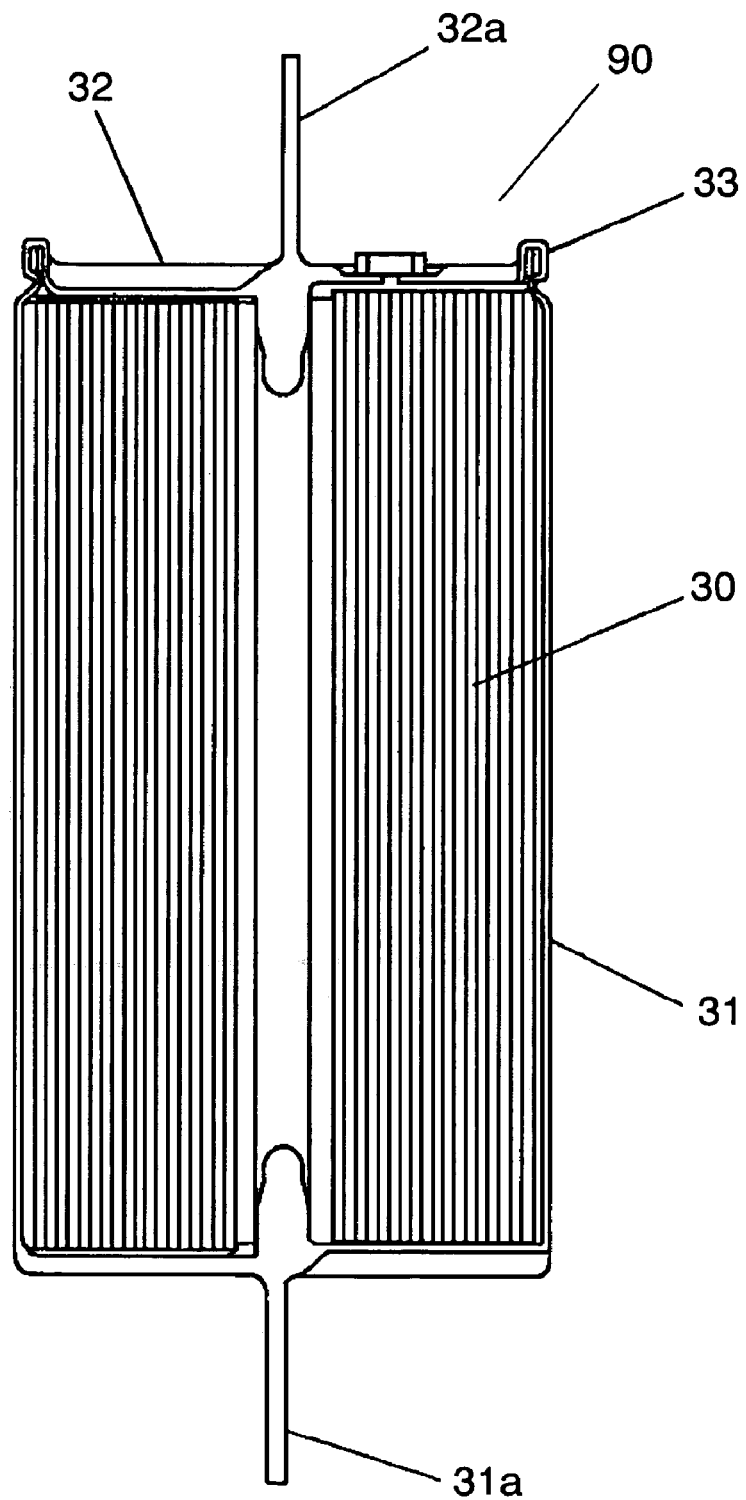
FIG. 9 is a sectional view depicting a structure of a capacitor used in a capacitor device of the prior art.
Figure 10A:
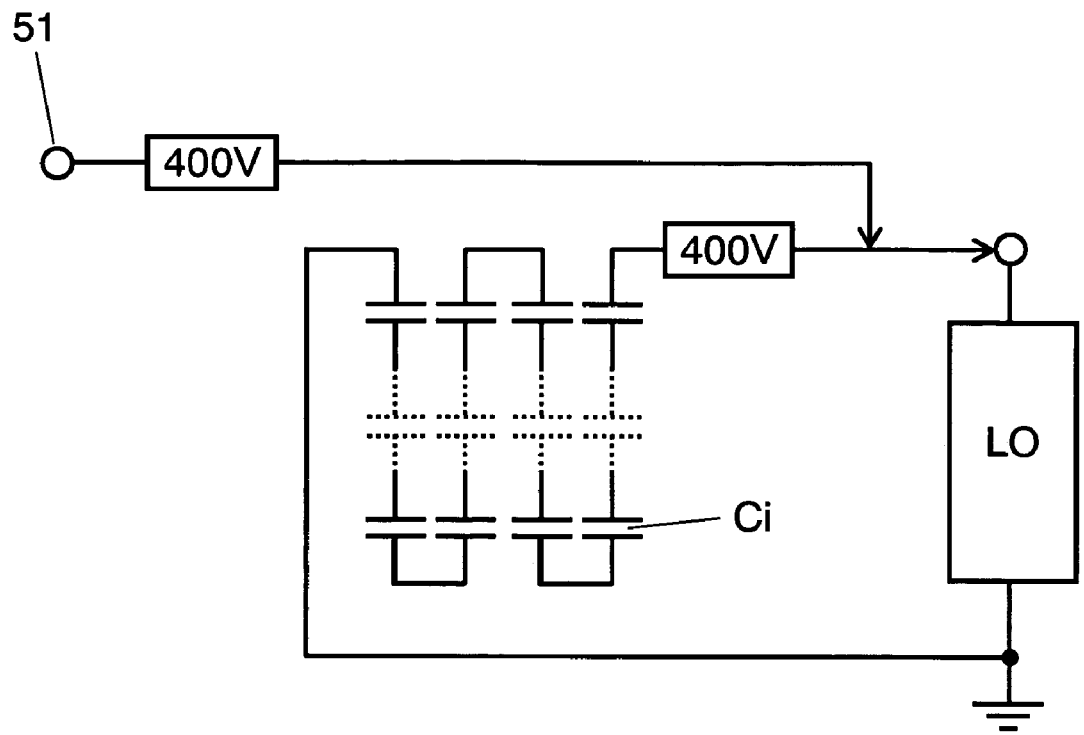
FIG. 10A is a conceptual diagram showing a theory of emerging an undesirable resistance when connecting a plurality of capacitor units of the prior art.
Figure 10B:
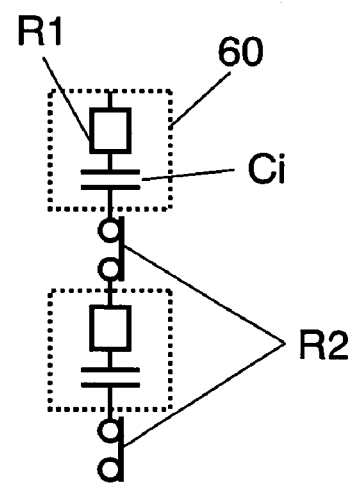
FIG. 10B is another conceptual diagram showing the theory of emerging the undesirable resistance when connecting the plurality of capacitor units of the prior art.

With reference to FIG. 8, description is provided hereafter of capacitor element 14. FIG. 8 is a sectional view which schematically illustrates a structure of capacitor element 14. Capacitor element 14 has a first electrode and a second electrode. One of the first electrode and the second electrode is a positive electrode, and the other is a negative electrode. In the example of FIG. 8, the positive electrode (i.e., the first electrode) is represented by first aluminum foil (collector) 141 having polarizable electrode layer 142 formed thereon, and the negative electrode (i.e., the second electrode) is represented by second aluminum foil (collector) 145 having polarizable electrode layer 144 formed thereon. First aluminum foil 141 and second aluminum foil 145 are wound together into such a configuration that their polarizable electrode layers 142 and 144 face each other through separator 143 with their positions shifted in opposite directions with respect to each other. The positive electrode and the negative electrode are tapped individually from both end surfaces of this capacitor element 14 (i.e., the top and the bottom sides in the figure).

As shown in FIG. 3A, capacitor element 14 is encased together with an activating electrolyte, although not show in the figure, inside metal case 15 made of aluminum having a cylindrical shape with a closed bottom. Capacitor element 14 has protrusion 15a formed unitarily with metal case 15 in an inner bottom surface thereof. This protrusion 15a is inserted into hollow space 14a of capacitor element 14. First capacitor 6A is completed when the end surface at the negative electrode side of capacitor element 14 inserted in metal case 15 is connected both mechanically and electrically to the inner bottom surface of metal case 15 by such means as laser welding.

In addition, first capacitor 6A is provided with terminal plate 16 made of aluminum, which is connected to the end surface at the positive electrode side of capacitor element 14, and placed on metal case 15 to seal an opening of metal case 15. This terminal plate 16 has terminal 16a disposed on its surface (i.e., upper side in the figure) for external connection.

Terminal plate 16 also has protrusion 16b unitarily formed on the underside thereof (i.e., lower side in the figure), which is inserted into hollow space 14a of capacitor element 14. Terminal plate 16 is placed in a manner to cover the opening of metal case 15 with insulator 17 set therebetween. There is sealing rubber 18 placed around a peripheral edge of the front side of terminal plate 16, and the open end of metal case 15 is crimped in a manner to compress this sealing rubber 18 to seal metal case 15.

In first capacitor 6A constructed as above, the positive electrode of capacitor element 14 is tapped through terminal 16a provided on terminal plate 16, and the negative electrode is tapped through metal case 15. On the other hand, second capacitor 6B is so constructed that the polarities are reversed with respect to first capacitor 6A. In other words, the positive electrode of capacitor element 14 is tapped through metal case 15 and the negative electrode is tapped through terminal 16a.

Metal plate 19 is provided to bridge between the bottom exterior surface of metal case 15 of first capacitor 6A and the bottom exterior surface of metal case 15 of second capacitor 6B, and coupled to metal cases 15 by laser welding. First capacitor 6A and second capacitor 6B are linked to each other in this manner to form a pair of (or a combination of two) capacitors, as they are connected both mechanically and electrically. In other words, capacitor unit 6 thus constructed has one each of first capacitor 6A and second capacitor 6B connected in series. A material such as aluminum is especially suitable for metal plate 19 used for the connection.

This metal plate 19 is formed in generally a hexagonal shape of such a size so that an area of metal plate 19 that comes in contact with the bottom exterior surface of each metal case 15 becomes less than 50% of the entire area of the bottom exterior surface of metal case 15. In this way, metal plate 19 ensures a sufficient coupling strength while also minimizing an adverse effect of a swelling phenomenon of the bottom of metal case 15, even if it occurs due to excessive built-up of a pressure inside of metal case 15 under any abnormal condition. In addition, metal plate 19 formed into generally the hexagonal shape allows use of a staggered pattern when cutting a material into numbers of metal plates 19, and it thereby reduces a loss of the material substantially.

FIG. 3B shows weld traces 19a made by laser welding when metal plate 19 is coupled to metal cases 15. The welding is so made that these weld traces 19a form linear patterns. This can reduce to the minimum extent possible an influence of distortion resulting from contraction of metal cases 15 when they return to the normal temperature after expansion by the heat of welding. Here, trifoliate groove 15b shown in FIG. 3B indicates a welding rib provided for coupling one of the end surfaces of capacitor element 14 to the inner bottom of metal case 15 by laser welding.

It is desirable that metal plate 19 has a thickness as thin as practicable within a range that can carry an allowable value of electric current for first capacitor 6A and second capacitor 6B without causing any failure, and also ensure a required strength as a connecting plate as well as a strength of the welding. It is desirable that the thickness is in a range of 0.1 to 0.8 mm, to be specific, and a range of 0.2 to 0.5 mm is even more desirable.

As described above, capacitor device 100 of this exemplary embodiment comprises the capacitors so constructed that the electrodes of capacitor elements 14 are tapped at one side through their metal cases 15, and the electrodes of the other side are tapped through terminals 16a provided on terminal plates 16 for external connections. A pair of the capacitors are so constructed that their polar orientations are opposite to each other, and they are connected electrically and mechanically with metal plate 19 to configure capacitor unit 6. A plurality of capacitor units 6 are connected to compose subunit 1, and a plurality of subunits 1 are further connected to compose main unit 2. Capacitor device 100 comprises case 3, which encloses main unit 2 and controller 4 for controlling this main unit 2. Capacitor device 100 of this exemplary embodiment helps ease the work of connections between the capacitors, and it makes down-sizing and low-profiling possible since it substantially reduces a space required for the connections. In addition, it can reduce an undesirable resistance associated with the connections. Furthermore, since the invention makes the plurality of units separately controllable, it can provide the capacitor device of a superior performance.

Second Exemplary Embodiment

Description is provided hereinafter of another mode of the present invention by describing a second exemplary embodiment.

A capacitor device of the second exemplary embodiment has subunit 201, a structure of which differs partly from that of capacitor device 100 described in the first exemplary embodiment. Since the structure other than the above is analogous to that of the first exemplary embodiment, like reference marks are used to designate like components, and description will be provided of only the different portions, with reference to the accompanying drawings while details of the like components are skipped.

Figure 4C:
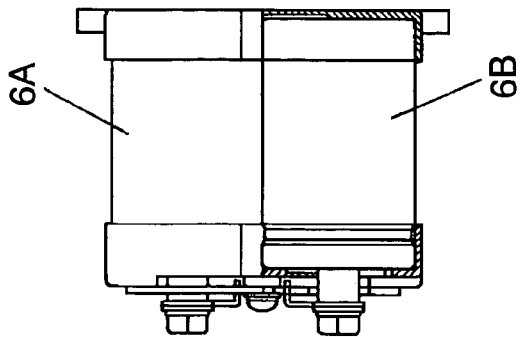
FIG. 4C is a side view depicting the structure of the subunit of the capacitor device according to the second exemplary embodiment of the present invention.
Figure 4A:
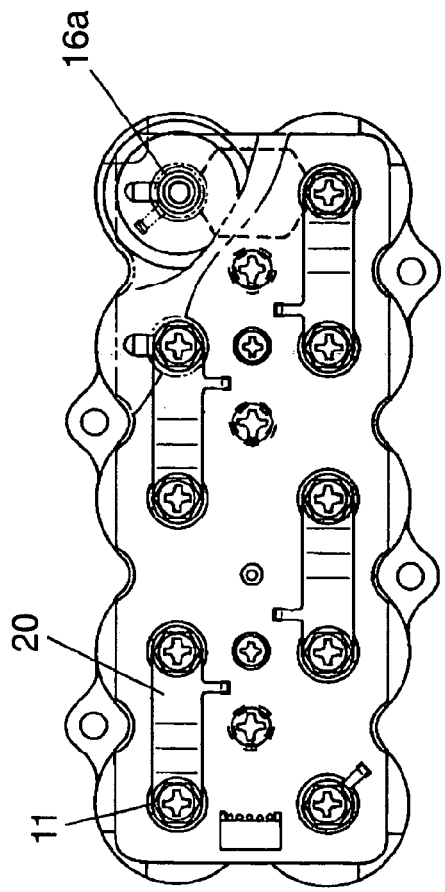
FIG. 4A is a plan view depicting a structure of a subunit of a capacitor device according to a second exemplary embodiment of the present invention.
Figure 4B:
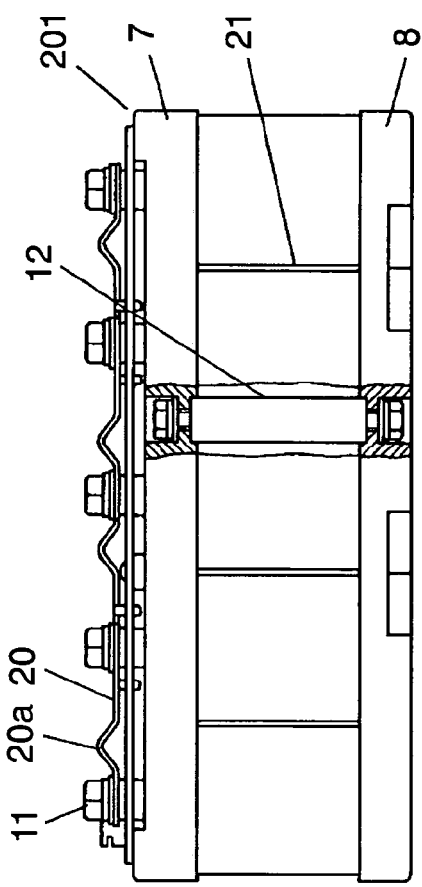
FIG. 4B is a front view depicting the structure of the subunit of the capacitor device according to the second exemplary embodiment of the present invention.

FIGS. 4A to 4C are a plan view, a front view and a side view depicting the structure of subunit 201 of the capacitor device according to the second exemplary embodiment of the present invention. Subunit 201 comprises bus bars 20, each electrically connecting adjoining terminals 16a of capacitor units 6, and bent portion 20a is provided in each bus bar 20 by bending a portion thereof.

Bent portion 20a provided in subunit 201 functions as a buffer to absorb dimensional variations even when such variations exist in heights of capacitor units 6 consisting of first capacitors 6A and second capacitors 6B. The structure can thus achieve the capacitor device capable of maintaining a high dimensional precision.

In addition, there are spaces 21 provided individually among the plurality of capacitor units that compose subunit 201. Spaces 21 provided in this manner can promote dissipation of the heat produced by first capacitors 6A and second capacitors to the outside, thereby achieving the capacitor device of a superior heat-radiating characteristic.

Third Exemplary Embodiment

Description is provided hereinafter of still another mode of the present invention by describing a third exemplary embodiment.

A capacitor device of the third exemplary embodiment has one of subunits 301 and 302, structures of which differ partly from that of capacitor device 100 described in the first exemplary embodiment. Since the structures other than the above are analogous to that of the first exemplary embodiment, like reference marks are used to designate like components, and description will be provided of only the different portions with reference to the accompanying drawings while details of the like components are skipped.

Figure 5A:
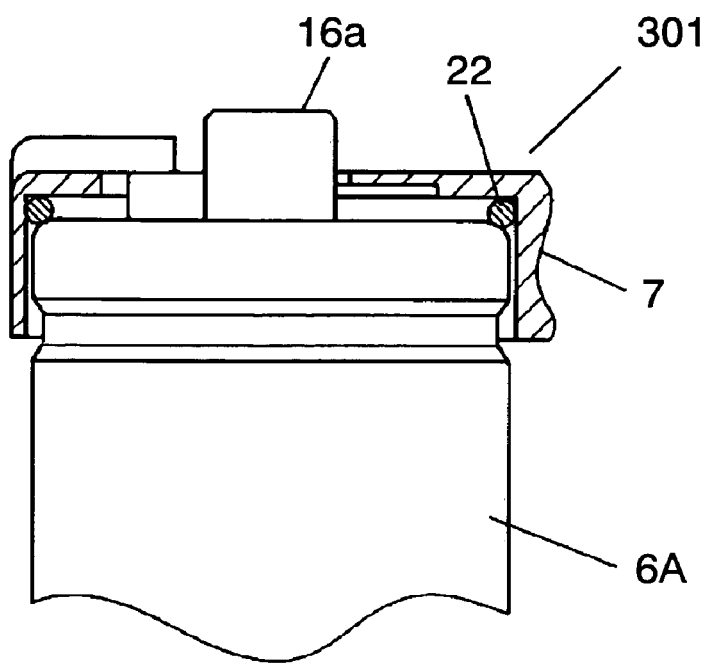
FIG. 5A is a sectional view depicting a main part of a structure of a subunit of a capacitor device according to a third exemplary embodiment of the present invention.

FIG. 5A is a sectional view depicting a main part of the structure of subunit 301 of the capacitor device according to the third exemplary embodiment of the present invention. Subunit 301 has first capacitor 6A, upper holder 7 and terminal 16a.

There is O-ring 22 made of rubber placed between a peripheral edge on an upper surface of first capacitor 6A and an inner surface of upper holder 7. This O-ring 22 serves as a buffer to absorb variations in heights of the individual capacitors that compose subunit 301. Even if the individual capacitors have such variations in their heights within a tolerable range, O-ring 22 can absorb the dimensional variations, and it thereby maintains a high dimensional precision of subunit 301.

Figure 5B:
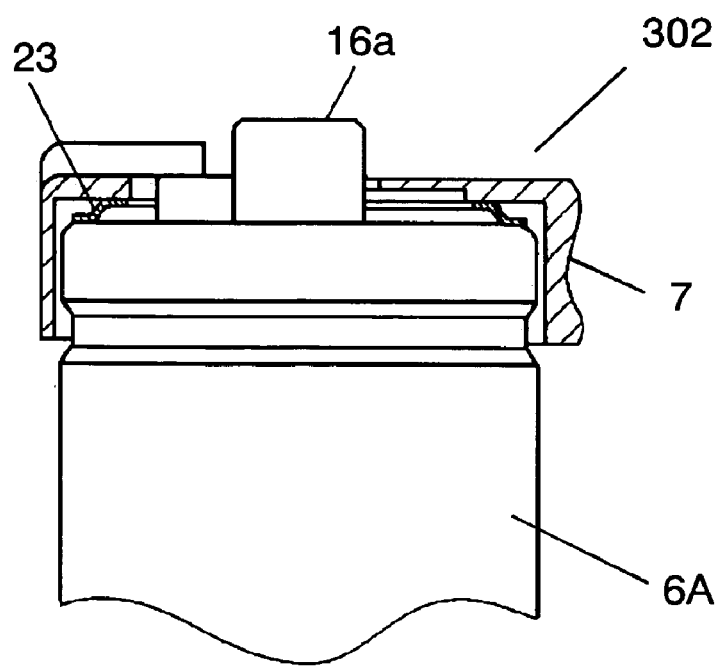
FIG. 5B is a sectional view depicting a main part of another structure of the subunit of the capacitor device according to the third exemplary embodiment of the present invention.

It is also suitable to use plate spring 23 made of a spring material such as phosphor bronze, as shown in subunit 302 of FIG. 5B, in order to make it function as the buffer to absorb the variations in the height of the individual capacitors.

It is thus possible, in the case of subunit 302, to make plate spring 23 absorb the dimensional variations within a tolerable range, even if such variations exist in the height of the individual capacitors, thereby maintaining a high dimensional precision of the subunit.

As described above, the capacitor device according to the third exemplary embodiment comprises any of O-ring 22 and plate spring 23 serving as a buffer, which is disposed between the peripheral edge on the upper surface of first capacitor 6A and the inner surface of upper holder 7, to absorb the variations in the height of the individual capacitors that form one of subunits 301 and 302. Any of the above structures can hence absorb the dimensional variations within the tolerable range, even when such variations exist in the heights of the individual capacitors, thereby maintaining the high dimensional precision of subunits 301 and 302.

In this third exemplary embodiment, although the description is provided of the example that either one of O-ring 22 and plate spring 23 serving as a buffer is disposed between the peripheral edge on the upper surface of the capacitor and the inner surface of upper holder 7, the present invention is not to be considered as restrictive, but it may be so embodied that the buffer is disposed between a bottom surface of capacitor 6A (or 6B) and an inner surface of lower holder 8.

Fourth Exemplary Embodiment

Description is provided hereinafter of yet another mode of the present invention by describing a fourth exemplary embodiment.

Capacitor device 400 disclosed in the fourth exemplary embodiment has a main unit, a structure of which differs partly from that of capacitor device 100 described in the first exemplary embodiment. Since the structure other than the above is analogous to that of the first exemplary embodiment, like reference marks are used to designate like components, and description will be provided of only the different portions with reference to the accompanying drawings while details of the like components are skipped.

Figure 7A:
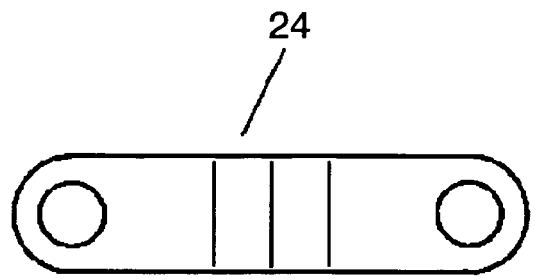
FIG. 7A is a plan view depicting a connecting plate used for the main unit of the capacitor device according to the fourth exemplary embodiment of the present invention.
Figure 7B:
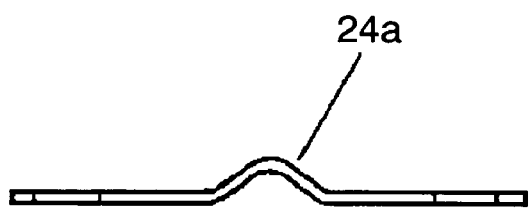
FIG. 7B is a front view depicting the connecting plate used for the main unit of the capacitor device according to the fourth exemplary embodiment of the present invention.

FIGS. 6A and 6B are a plan view and a front view depicting a main part of the structure of the main unit of capacitor device 400 according to the fourth exemplary embodiment of the present invention. FIGS. 7A and 7B are a plan view and a front view depicting connecting plate 24 used for the main unit. Capacitor device 400 has connecting plate 24 connecting terminals of adjoining subunits 1, and bent portion 24a is provided in connecting plate 24 by bending a portion thereof.

Owing to the structure, in which connecting plate 24 having bent portion 24a is used for connecting between the terminals of adjoining subunits 1, this bent portion 24a plays the role of buffer to absorb dimensional variations even when they exist in the heights of the adjoining subunits 1. As a result, the structure can achieve the capacitor device capable of maintaining a high dimensional precision.

In addition, there are spaces 25 provided individually among the plurality of subunits 1 that compose the main unit. Spaces 25 provided in this manner can promote dissipation of the heat produced by subunits 1 to the outside, thereby achieving the capacitor device of a superior heat-radiating characteristic.

INDUSTRIAL APPLICABILITY

A capacitor device of the present invention helps facilitate connections between capacitors. The invention substantially reduces space required for the connections, decreases an undesirable resistance associated with the connections, makes a plurality of units separately controllable, and thereby has an advantage of realizing the capacitor device of small size and high performance, which is suitable for use in a regeneration system of a hybrid car, fuel cell vehicle, or the like.

The invention claimed is:

1. A capacitor device containing a plurality of capacitors, each of the capacitors comprising a capacitor element having a positive electrode and a negative electrode in a confronting arrangement through a separator, and a metal case containing the capacitor element and an electrolyte,
   the plurality of capacitors comprising a plurality of first capacitors, each using the metal case as a negative electrode thereof, and a plurality of second capacitors, each using the metal case as a positive electrode thereof,
   wherein each of a plurality of capacitor units is formed by one of the first capacitors and one of the second capacitors with their metal cases coupled together through a metal plate,
   each of a plurality of subunits is formed by a plurality of the capacitor units connected in any of series and parallel, and
   a main unit of the capacitor device is formed by the plurality of subunits connected in any of series and parallel.

2. The capacitor device as set forth in claim 1, wherein
   for each of the capacitors, a terminal plate covers an opening of the metal case, and
   a terminal is connected to one of the positive electrode and the negative electrode; and
   the terminal connected to the positive electrode of one of the capacitor units and another terminal connected to the negative electrode of the adjoining capacitor unit are connected with a bus bar.

3. A capacitor device containing a plurality of capacitors, each of the capacitors comprising a capacitor element, a metal case and a terminal plate,
   the capacitor element comprising a first electrode, a second electrode and a separator, wherein each of the first electrode and the second electrode is made of a metal foil having a polarizable electrode layer formed thereon, the first electrode and the second electrode are wound into a configuration such that the polarizable electrode layer of the first electrode and the polarizable electrode layer of the second electrode face each other through the separator with the first electrode and the second electrode shifted beyond sides of the separator in opposite directions with respect to each other,
   the metal case containing the capacitor element and an electrolyte in a manner that the first electrode is coupled to a bottom surface of the metal case,
   the terminal plate covering an opening of the metal case, the second electrode coupled to a terminal provided on the terminal plate, wherein
the plurality of capacitors are coupled to form capacitor units, each including a pair of the capacitors having the first electrodes of opposite polarities with respect to each other and the metal cases of the pair of the capacitors are coupled together,
a plurality of the capacitor units are connected in any of series and parallel to form subunits,
a plurality of the subunits are connected in any of series and parallel to form a main unit, and
the capacitor device further comprises a case containing the main unit and a controller for controlling the main unit.

4. The capacitor device as set forth in claim 3 further comprising, for each of the capacitor units, a metal plate coupling together the metal cases of the pair of the capacitors.

5. The capacitor device as set forth in claim 3 further comprising:
a bus bar connecting together the capacitor units;
an upper holder made of an insulation material holding an upper side of the subunits;
a lower holder made of an insulation material holding a lower side of the subunits; and
a prop retaining the upper holder and the lower holder.

6. The capacitor device as set forth in claim 5, wherein the bus bar has a bent portion.

7. The capacitor device as set forth in claim 5 further comprising a buffer placed between at least one of the upper holder and the lower holder and the capacitors for absorbing a variation in height of the capacitors.

8. The capacitor device as set forth in claim 3, wherein each of the subunits has a space provided between the plurality of capacitor units.

9. The capacitor device as set forth in claim 3 further comprising a connecting plate connecting together the plurality of subunits, and the connecting plate having a bent portion.

10. The capacitor device as set forth in claim 3, wherein the main unit has a space provided between the plurality of subunits.

11. The capacitor device as set forth in claim 3, wherein:
each of the subunits has a circuit board,
the circuit board being provided with a balancing charge circuit for adjusting charge voltages of the capacitors equally, an over-voltage detecting circuit for detecting an over-voltage during a charging state, and a thermometric circuit for monitoring a temperature around the capacitors; and
each of the subunits is connected to the controller.

* * * * *